United States Patent [19]
Yan

[11] Patent Number: 5,999,928
[45] Date of Patent: Dec. 7, 1999

[54] ESTIMATING THE NUMBER OF DISTINCT VALUES FOR AN ATTRIBUTE IN A RELATIONAL DATABASE TABLE

[75] Inventor: Weipeng Yan, Redwood City, Calif.

[73] Assignee: Informix Software, Inc., Menlo Park, Calif.

[21] Appl. No.: 08/884,931

[22] Filed: Jun. 30, 1997

[51] Int. Cl.$^6$ .................................................. G06F 17/30
[52] U.S. Cl. ...................... 707/6; 707/2; 707/3; 707/100
[58] Field of Search ............................. 707/2, 6, 8, 100, 707/200; 395/611; 379/88.17

[56] References Cited

U.S. PATENT DOCUMENTS

| | | | |
|---|---|---|---|
| 5,295,256 | 3/1994 | Bapat | 395/500 |
| 5,414,834 | 5/1995 | Alexander et al. | 707/100 |
| 5,542,089 | 7/1996 | Lindsay et al. | 707/2 |
| 5,546,575 | 8/1996 | Potter et al. | 707/101 |
| 5,724,573 | 3/1998 | Agrawal et al. | 707/6 |
| 5,752,025 | 5/1998 | Shakib et al. | 707/102 |
| 5,784,017 | 7/1998 | Craven | 341/126 |
| 5,878,426 | 3/1999 | Plasek et al. | 707/102 |
| 5,890,148 | 3/1999 | Bhargava et al. | 707/2 |

OTHER PUBLICATIONS

Faloutsos, C., et al., "Modeling Skewed Distribution Using Multifractals and the '80–20 Law'," Proceedings of the Twenty–second International Conference on Very Large Data Bases (Bombay, India, T.M. Vijayaraman et al., eds.) pp. 307–137 (Sep. 1996).

Graefe, G., "Selectivity Estimation Using Moments and Density Functions," Technical Report CS/E 87–012, Dept of Computer Science and Engineering, Oregon Graduate Center (Nov. 1987).

Haas, P.J., et al., "Sampling–Based Estimation of the Number of Distinct Values of an Attribute," Proceedings of the 21st International Conference on Very Large Data Bases (Zurich, Switzerland, U. Dayal et al., eds.), pp.311–322 (Sep. 1995).

Ioannidis, Y.E., and Poosala, V., "Balancing Histogram Optimality and Practicality for Query Result Size Estimation," SIGMOD Record:Proceedings of the 1995 SIGMOD (Special Interest Group on Management of Data, Association for Computing Machinery) (int'l conference, May '95, San Jose, California) 24(2)233–244 (Jun. 1995).

Ioannidis, Y.E., and Poosala, V., "Histogram–Based Solutions to Diverse Database Estimation Problems," *Data Engineering Bulletin*, 18(3):10–18 (Sep. 1995).

Mannino, M.V., et al., "Statistical Profile Estimation in Database Systems," *Computing Surveys*, 20(3):191–221 (Sep. 1988).

Muralikrishna, M., and DeWitt, D.J., "Equi–Depth Histograms for Estimating Selectivity Factors for Multidimensional Queries," SIGMOD Record:Proceedings of the 1988 SIGMOD Int'l Conference on Management of Data (Jun. '88, Chicago, Illinois) 17(3) :28–36 (Sep. 1988).

Piatetsky–Shapiro, G., and Connell, C., "Accurate Estimation of the Number of Tuples Satisfying a Condition, " SIGMOD Record:Proceedings of the Annual Meeting (Jun. 1984, Boston, MA) 14(2):256–276 (1984).

(List continued on next page.)

*Primary Examiner*—Paul R. Lintz
*Assistant Examiner*—Ella Colbert
*Attorney, Agent, or Firm*—Fish & Richardson P.C.

[57] ABSTRACT

A method and apparatus for estimating the number of distinct values in a database table selects one of several numerical methods to solve a model of the number of distinct values in a database table based on a table size, a sample size, and the number of distinct values in the sample. The sample may be a sample previously collected for purposes other than to estimate the number of distinct values, and the number of records in the sample and the number of distinct values in the sample may be determined at the time the sample was collected.

23 Claims, 4 Drawing Sheets

OTHER PUBLICATIONS

Poosala, V., et al., "Improved Histograms for Selectivity Estimation of Range Predicates," *SIGMOD Record:* Proceedings of the 1996 SIGMOD Int'l conference on Management of Data (Jun. 1996, Montreal, Canada) 25(2):294–305 (Jun. 1996).

Poosala, V., and Ioannidis, Y.E., "Estimation of Query–Result Distribution and its Application in Parallel–Join Load Balancing," Proceedings of the Twenty–second International Conference on Very Large Data Bases (Bombay, India, T.M. Vijayaraman et al., eds.) pp. 448–459 (Sep. 1996).

Press, W.H., et al., *Numerical Recipes,* The Art of Scientific Computing, Chapters 9.1–9.4.

Swami, A., and Schiefer, K.B., "On the Estimation of Join Result Sizes," *Advances in Database Technology—EDBT '94,* 4th Int'l Conference on Extending Database Technology (Cambridge, UK, M. Jarke et al., eds.) 287–300 (Mar. 1994).

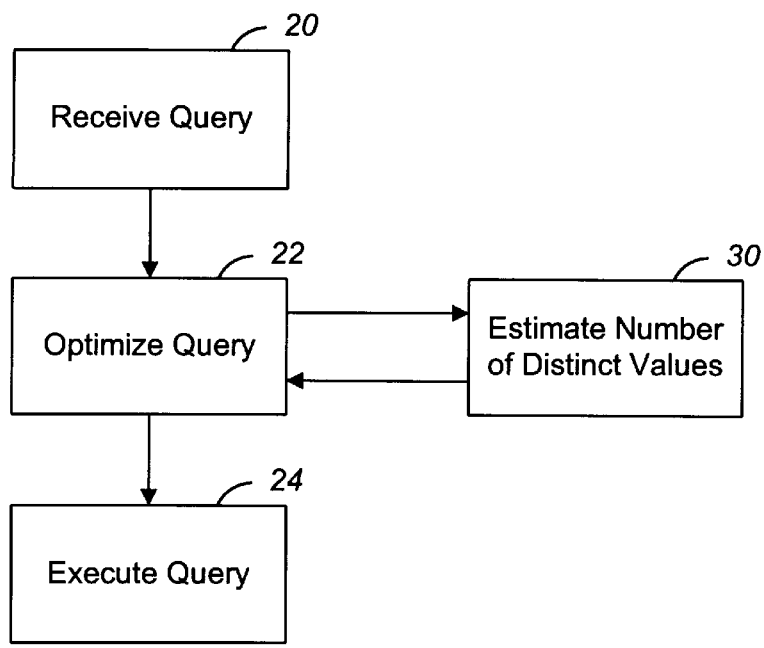
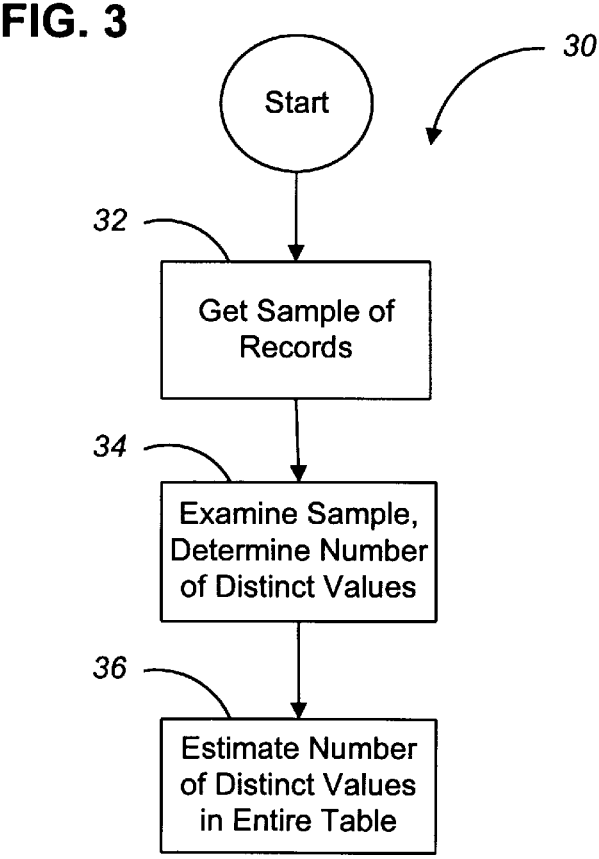

FIG. 5
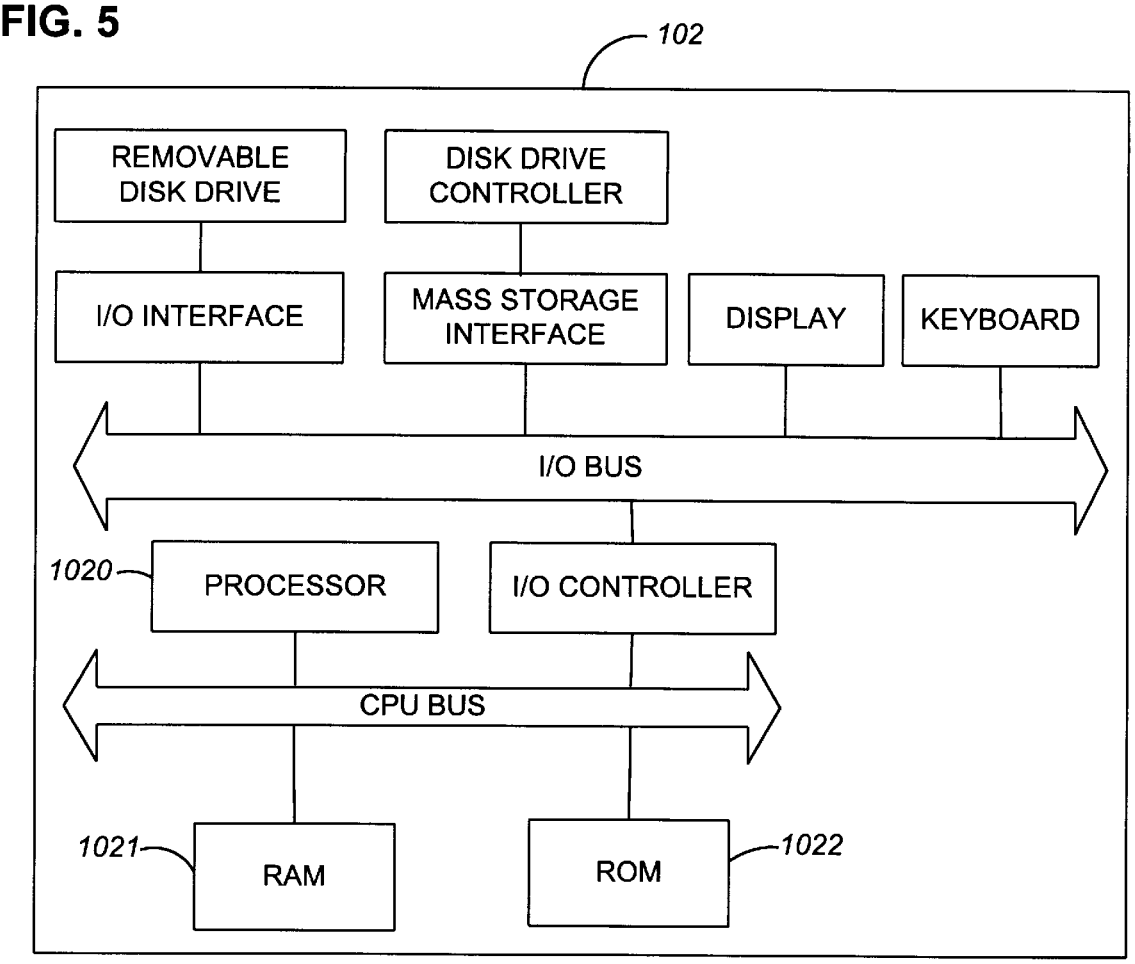
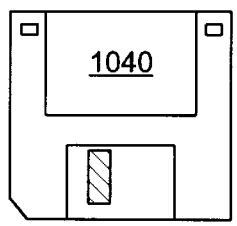

ESTIMATING THE NUMBER OF DISTINCT VALUES FOR AN ATTRIBUTE IN A RELATIONAL DATABASE TABLE

BACKGROUND

The invention relates to methods and apparatus for optimizing queries in a relational database system.

A database is a collection of information. A relational database is a database that is perceived by its users as a collection of tables. Each table arranges items and attributes of the items in rows and columns respectively. Each table row corresponds to an item (also referred to as a record or tuple), and each table column corresponds to an attribute of the item (referred to as a field, an attribute type, or field type).

To retrieve information from a database, the user of a database system constructs a query. A query contains one or more operations that specify information to retrieve from the database. The system scans tables in the database to execute the query.

A database system can optimize a query by arranging the order of query operations. The number of distinct values for an attribute is one statistic that a database system uses to optimize queries. When the actual number of distinct values is unknown, a database system can use an estimate.

An accurate estimate of the number of distinct values for an attribute is useful in methods for optimizing a query involving multiple join operations. A database system can use the estimate in methods that determine the order in which to join tables. An accurate estimate of the number of distinct values for an attribute is also useful in methods that reorder and group items.

SUMMARY

In one aspect, the invention is directed to a computer-implemented method for estimating the number of distinct values for an attribute in a database table. In another aspect, the invention is a computer program, residing on a computer-readable medium, that configures a computer to estimate the number of distinct values for an attribute in a database table.

In both aspects, the estimation uses a sample of records from a database table, determines the number of records in the sample, determines the number of distinct values for an attribute in the sample, determines the size of the database table, and selects one of a plurality of numerical methods to solve a model of the number of distinct values for the attribute in the database table in order to calculate an estimate of the number of distinct values in the database table.

In other aspects of the invention, the sample of records is a previously collected sample of records that was collected for purposes other than to estimate distinct values in the database table, and the number of records in the sample and the number of distinct values in the sample were determined at the time the sample was collected.

The invention can use the model $0 = 1 - N/n*(1-(1-t/T)^{(T/N)})$, where N is the number of distinct values for the attribute in the database table, n is the number of distinct values for the attribute in the sample, t is the number of records in the sample, and T is the size of the database table, and where solving for N, given values of n, t, and T, yields an estimate of the number of distinct values in the database table. The invention can use one or more numerical methods to solve the model, and the invention can use, for example, the secant method, the bisection method, and Newton's method to find the root.

The invention has several advantages. The invention uses a simplified model based on sampling with replacement and provides accurate estimates. The invention achieves accuracy using relatively small sample sizes. For example, the number of records in the sample of records can be in the range of 1,000 records to 5,000 records, regardless of the size of the database table. The invention re-uses small samples collected for other purposes and re-uses data, such as the number of distinct values in a previously collected sample.

Other features and advantages of the invention will become apparent from the following description and from the claims.

BRIEF DESCRIPTION OF THE DRAWINGS

FIG. 2 is a flow chart of a context in which the present invention is used.

FIG. 3 is a flow chart of preliminary steps in the present invention.

FIG. 5 is a block diagram of a computer system platform suitable for an embodiment of a database system.

DETAILED DESCRIPTION

Figure 1:
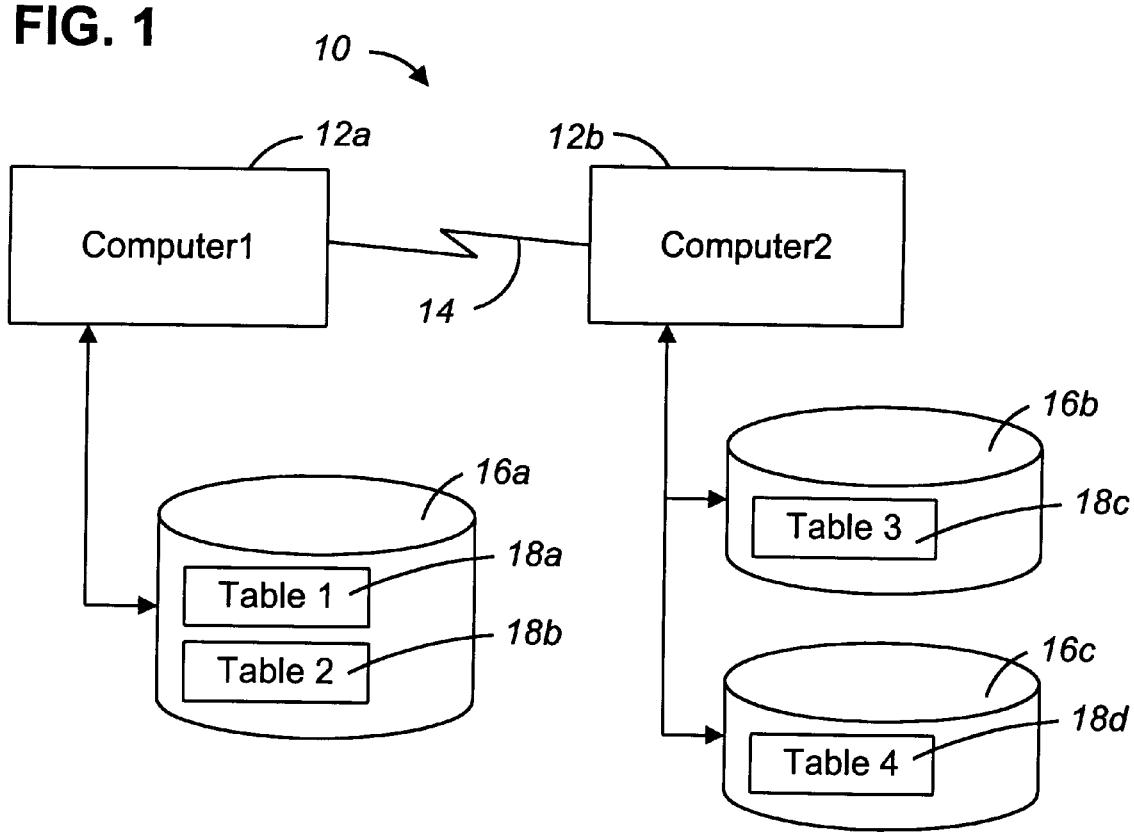
FIG. 1 is a block diagram of a computer system supporting a relational database system.

FIG. 1 illustrates a computer system 10 that is a suitable platform for supporting a relational database system and storing relational database tables, which will be referred to simply as tables. The computer system 10 includes one or more computers 12 (individually, computers 12a and 12b). Multiple computers may be connected by a link 14, which may be a high-speed backbone that creates the cluster of computers, or a local or wide-area network connection linking the computers. The computers have one or more persistent data stores 16a–16c.

A database initially includes a set of relational tables called "system catalogs." The system catalogs describe all aspects of the database, including the definitions of all tables 18a–d. The system catalogs also store system statistics, for example, the number of distinct values of an attribute.

Database systems optimize queries to increase the speed in which they process information in the database tables. As shown in FIG. 2, after the system receives a query (step 20), the system optimizes the query (step 22). One important statistic for query optimization is the number of distinct values for an attribute in a table. A query optimization process can use the exact number of distinct values for a given attribute or obtain an estimate for the number of distinct values for an attribute (step 30). After optimizing the query, the system executes the query (step 24).

As shown in FIG. 3, a method for estimating the number of distinct values for an attribute begins by retrieving a sample of records from a table (step 32). Generally, a database system collects samples at pre-set time intervals or upon demand.

The database system examines the sample and determines the number of distinct values for an attribute in the sample (step 34). Based on the number of distinct values in the sample, the system estimates the number of distinct values for the attribute in the entire table (step 36), as will be described.

The estimation is based on a model that assumes that data is uniformly distributed and assumes that sampling is done with replacement. This is done even though the method actually uses sampling without replacement. Assuming sampling with replacement simplifies the model, therefore reducing the amount of time taken to solve the model, reducing the likelihood of producing mathematical errors, and reducing the likelihood that a numerical technique chosen to solve the model will fail to converge. The model is expressed as $$n=N*(1-(1-t/T)^{(T/N)})$$

where n is the number of distinct values for an attribute in the sample,

N is the number of distinct values for an attribute in the table, t is the sample size, and T is the table size.

The method estimates the number of distinct values for an attribute by finding the root of the function $$f(N)=1-N/n*(1-(1-t/T)^{(T/N)}).$$

The function was derived by first considering that the probability of a record in the table appearing in the sample is t/T. Therefore, the probability that a record in the table does not appear in the sample is 1−t/T. The number of occurrences of a particular attribute value in the table, assuming uniformity, is estimated to be T/N. Thus, the probability that a particular attribute value does not appear in the sample is $(1-t/T)^{T/N}$ and the probability that the particular attribute value does appear in the sample is $1-(1-t/T)^{T/N}$. Finally, the number of distinct values for an attribute in the sample is $n=N*(1-(1-t/T)^{(T/N)})$, otherwise expressed as $0=f(N)=1-N/n*(1-(1-t/T)^{(T/N)})$.

The method selects one of several numerical techniques to solve for N, recognizing that certain techniques are more suitable than others depending on the table size, the sample size, and the number of distinct values in the sample.

Three root-finding techniques used by the method are the secant method, the bisection method, and Newton's method. The secant method determines where a line between two points passes through zero and uses that position to select a point for the next iteration. The bisection method examines the midpoint of an interval that has two bracketing points (i.e., points with function values having opposite signs), and using the midpoint's position, replaces the bracketing point that has the same sign as the midpoint. Newton's method uses the function and its derivative to select a point for the next iteration.

Figure 4:
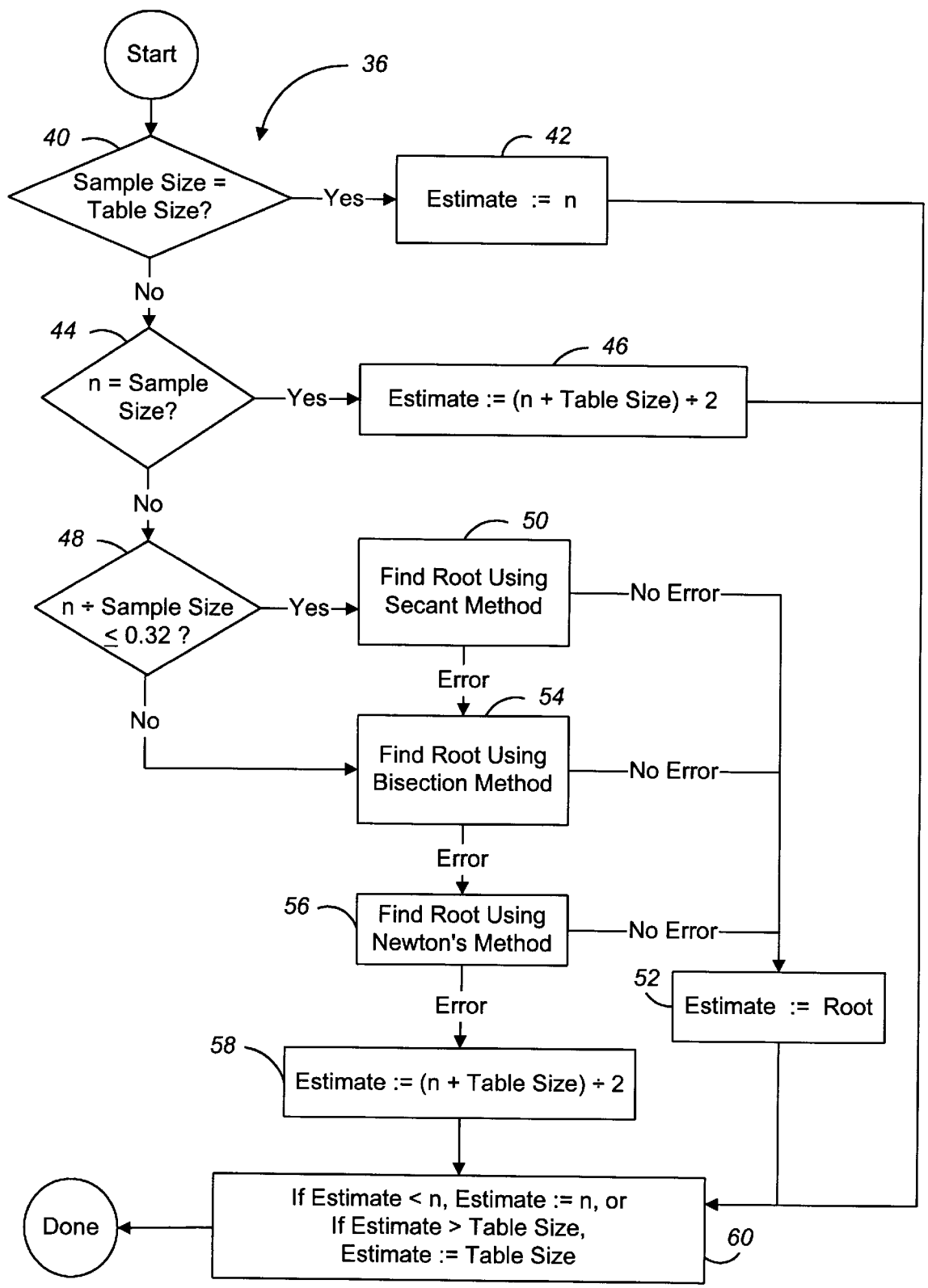
FIG. 4 is a flow chart of a method that selects a technique that solves a model of the number of distinct values in a database table.

As shown in the flow chart depicted in FIG. 4, the method estimates the number of distinct values given a sample size, a table size, and the number of distinct values in the sample (i.e., n). If the sample size equals the table size (step 40), the estimated number of distinct values is the number of distinct values in the sample (step 42). If the number of distinct values in the sample is equal to the sample size (step 44), the estimate is half the sum of the number of distinct values in the sample and the size of the table (step 46).

Otherwise, if the number of distinct values in the sample divided by the sample size is equal to or less than an empirically derived threshold value (step 48), the secant method is used to find the root of the function (step 50), which is the estimate (step 52). (For the present embodiment, the threshold was determined to have a value of 0.32.) If the number of distinct values in the sample divided by the sample size is greater than the threshold value (step 48) or the secant method produces an error, the bisection method is used to find the root of the function (step 54), which is the estimate (step 52). If the bisection method produces an error, Newton's method is used to find the root of the function (step 56), which is the estimate (step 52). If Newton's method produces an error, the estimate is half the sum of the number of distinct values in the sample and the size of the table (step 58).

One type of error the numerical methods may produce is a mathematical error, such as a floating-point or divide-by-0 error. The numerical methods may also produce an error when the root-finding technique fails to converge.

As a final step, the method ensures that the estimate is no less than the distinct number of values in the sample and no greater than the actual table size (step 60).

The method was tested using permutations of simulated data for the table size (i.e., T), the sample size (i.e., t), and the number of distinct values for an attribute in the table (i.e., N). The test used seventeen values ranging from 5,000 to 1,000,000,000 for the table size. The test used five values ranging from 1,000 to 5,000 in steps of 1,000 for the sample size. The test used thirty-eight values ranging from 0.0000000001 to 100 that represented the percentage of distinct values in the table (i.e., N/T*100).

A random number generator process produced the samples. The random number generator process took as input a sample size, a table size, and a percentage of distinct values in the table. The process output the number of distinct values in the sample.

For each test case, an error was calculated using the formula |(N_est−N)/N|, where N_est is the estimated number of distinct values in the table and N is the actual number of distinct values in the table. The errors were averaged for several ranges of test data, as shown in the following table. The average error for all permutations of the test data was 0.552.

| Distinct Values (n) in Sample Size (t) | Average Error | Distinct Values (n) in Sample Size (t) | Average Error |
| --- | --- | --- | --- |
| n/t ≤ 99.99% | 0.170 | n/t > 99.99% | 0.910 |
| n/t ≤ 99.5% | 0.104 | n/t > 99.5% | 0.838 |
| n/t ≤ 99% | 0.094 | n/t > 99% | 0.819 |
| n/t ≤ 95% | 0.064 | n/t > 95% | 0.768 |

In the preceding table, the first and third columns group the test cases according to the percentage of distinct values for an attribute in a sample. The second and fourth columns contain the average of the errors for the respective test cases.

The method achieves a high level of accuracy even when the sample size is small. This allows the method to re-use samples that the database system obtains for other purposes. For example, database systems may use samples ranging in size from 1,000 to 5,000 records, regardless of the table size, to compute a histogram showing the distribution of an attribute's value. To compute the histogram, the database system determined the number of distinct values in the sample, which is a result the method can re-use to determine the number of distinct values in the corresponding table.

Shown in FIG. 5 is a block diagram of a computer 102 suitable for use in the computer system platform described earlier with reference to FIG. 1. The invention may be implemented in digital electronic circuitry or in computer hardware, firmware, software, or in combinations of these. Apparatus of the invention may be implemented in a computer program product tangibly embodied in a machine-readable storage device for execution by a computer processor. Method steps of the invention may be performed by a computer processor executing a program to perform functions of the invention by operating on input data and generating output. Suitable processors 1020 include, by way of example, both general and special purpose microprocessors. Generally, a processor will receive instructions and data from a read-only memory 1022 and/or a random access memory 1021. Storage devices suitable for tangibly embodying computer program instructions include all forms of non-volatile memory, including by way of example, semiconductor memory devices, such as EPROM, EEPROM, and flash memory devices, magnetic tapes, magnetic disks such as internal hard disks and removable disks 1040, magneto-optical disks, and CD-ROM disks. Any of the foregoing may be supplemented by, or incorporated in specially designed ASICS (application-specific integrated circuits).

Other embodiments are within the scope of the following claims. For example, the order of performing steps of the invention may be changed by those skilled in the art and still achieve desirable results. The invention can use other numerical methods to solve the model. The invention can find distinct values for multiple attributes. The invention also applies to object-relational database systems, where an attribute can be of a complex data type, that is, a data type comprised of one or more existing data types. For example, a character string and an integer can be combined to generate a complex data type named person, with the character string representing a person's name and the integer representing the person's age.

What is claimed is:

1. In a relational database system, a computer-implemented method for estimating the number of distinct values for an attribute in a database table, comprising:

determining a size of the database table;

obtaining a sample of records from the database table and determining a number of records in the sample and a number of distinct values for the attribute in the sample; and using the size of the database table, the size of the sample, and the number of distinct values for the attribute in the sample to select one of a plurality of numerical methods to solve a model of the number of distinct values for the attribute in the database table to calculate an estimate of the number of distinct values for the attribute in the database table, wherein the model is $0=1-N/n*(1-(1-t/T)^{(T/N)})$, where N is the number of distinct values for the attribute in the database table, n is the number of distinct values for the attribute in the sample, t is the number of records in the sample, and T is the size of the database table, and where solving for N, given values of n, t, and T, yields an estimate of the number of distinct values in the database table.

2. The method of claim 1, wherein:

the plurality of numerical methods include the secant method and the bisection method.

3. The method of claim 1, wherein:

the number of distinct values in the sample divided by the sample size is compared to a threshold value, and if the quotient is less than or equal to the threshold value, using the secant method as the selected numerical method, and if the quotient is greater than the threshold value or the secant method produces an error, using the bisection method as the selected numerical method, and if the bisection method produces an error, using Newton's method as the selected numerical method.

4. The method of claim 3, wherein:

if Newton's method produces an error, the estimated number of distinct values is half the sum of the number of distinct values in the sample and the size of the database table.

5. The method of claim 3, wherein:

if the estimated number of distinct values is less than the number of distinct values in the sample, then the estimated number of distinct values is set to the number of distinct values in the sample; and if the estimated number of distinct values is greater than the size of the database table, then the estimated number of distinct values is set to the size of the database table.

6. The method of claim 3, wherein:

the threshold value is 0.32.

7. The method of claim 3, wherein:

the sample was previously collected for a purpose other than to estimate distinct values in the database table;

the number of records in the sample and the number of distinct values in the sample were determined at the time the sample was collected; and the error arising from applying the numerical method comprises a failure of the numerical method to converge.

8. The method of claim 1, wherein:

the sample was previously collected for a purpose other than to estimate the number of distinct values in the database table.

9. The method of claim 1, wherein:

the sample was previously collected and the number of records in the sample and the number of distinct values in the sample were determined at the time the sample was collected.

10. The method of claim 1, further comprising:

selecting and using a second numerical method if an error occur using the first selected numerical method.

11. The method of claim 10, further comprising:

selecting and using a third numerical method if an error occurs using the second selected numerical method.

12. A computer-implemented method for estimating the number of distinct values for an attribute in a database table, comprising:

using a model of the number of distinct values for the attribute in the database table, the model being $0=1-N/n*(1-(1-t/T)^{(T/N)})$, where N is the number of distinct values for the attribute in the database table, n is the number of distinct values for the attribute in a sample from the database table, t is the number of records in the sample, and T is the size of the database table; and solving for N, given values of n, t, and T, by using a numerical method to find a value for N that satisfies the model, the found value for N being the estimate of the number of distinct values for the attribute in the database table.

13. A computer program, residing on a computer-readable medium, comprising instructions causing a computer to:

determine a size of a database table;

obtain a sample of records from the database table, and determine a number of records in the sample and a number of distinct values for an attribute in the sample; and use the size of the database table, the size of the sample, and the number of distinct values for the attribute in the sample to select one of a plurality of numerical methods to solve a model of the number of distinct values for the attribute in the database table to calculate an estimate of the number of distinct values for the attribute in the database table, wherein the model is $0=1-N/n*(1-(1-t/T)^{(T/N)})$, where N is the number of distinct values for the attribute in the database table, n is the number of distinct values for the attribute in the sample, t is the number of records in the sample, and T is the size of the database table, and where solving for N, given values of n, t, and T, yields an estimate of the number of distinct values in the database table.

14. The computer program of claim 13, wherein:

the number of distinct values in the sample divided by the sample size is compared to a threshold value, and if the quotient is less than or equal to the threshold value, using the secant method as the selected numerical method, and if the quotient is greater than the threshold value or the secant method produces an error, using the bisection method as the selected numerical method, and if the bisection method produces an error, using Newton's method as the selected numerical method.

15. The computer program of claim 14, wherein:

if Newton's method produces an error, the estimated number of distinct values is half the sum of the number of distinct values in the sample and the size of the database table.

16. The computer program of claim 14, wherein:

if the estimated number of distinct values is less than the number of distinct values in the sample, then the estimated number of distinct values is set to the number of distinct values in the sample; and if the estimated number of distinct values is greater than the size of the database table, then the estimated number of distinct values is set to the size of the database table.

17. The computer program of claim 14, wherein:

the threshold value is 0.32.

18. The computer program of claim 14, wherein:

the sample was previously collected for a purpose other than to estimate distinct values in the database table;

the number of records in the sample and the number of distinct values in the sample were determined at the time the sample was collected; and the error arising from applying the numerical method comprises a failure of the numerical method to converge.

19. The computer program of claim 13, wherein:

the sample was previously collected for purposes other than to estimate the number of distinct values in the database table.

20. The computer program of claim 13, wherein:

the sample was previously collected and the number of records in the sample and the number of distinct values in the sample were determined at the time the sample was collected.

21. The computer program of claim 13, further comprising instructions to:

select and use a second numerical method if an error occurs using the first selected numerical method.

22. The computer program of claim 21, further comprising instructions to:

select and use a third numerical method if an error occurs using the second selected numerical method.

23. A computer program, residing on a computer-readable medium, comprising instructions causing a computer to:

use a model of the number of distinct values for an attribute in a database table, the model being $0=1-N/n*(1-(1-T)^{(T/N)})$, where N is the number of distinct values for the attribute in the database table, n is the number of distinct values for the attribute in a sample from the database table, t is the number of records in the sample, and T is the size of the database table; and solving for N, given values of n, t, and T, by using a numerical method to find a value for N that satisfies the model, the found value for N being the estimate of the number of distinct values for the attribute in the database table.

* * * * *